United States Patent
Jung et al.

(10) Patent No.: US 12,126,133 B2
(45) Date of Patent: Oct. 22, 2024

(54) FIBER-BASED HIGH REPETITION RATE FEMTOSECOND LASER SOURCE AND LASER PROCESSING SYSTEM INCLUDING THE SAME

(71) Applicant: KOREA INSTITUTE OF MACHINERY & MATERIALS, Daejeon (KR)

(72) Inventors: Kwangyun Jung, Daejeon (KR); Sang Hoon Ahn, Daejeon (KR); Jiyeon Choi, Daejeon (KR); Dohyun Kim, Daejeon (KR); Ji-Whan Noh, Daejeon (KR); Hee-shin Kang, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 182 days.

(21) Appl. No.: 17/904,729

(22) PCT Filed: Mar. 9, 2021

(86) PCT No.: PCT/KR2021/002889
§ 371 (c)(1),
(2) Date: Aug. 22, 2022

(87) PCT Pub. No.: WO2021/182839
PCT Pub. Date: Sep. 16, 2021

(65) Prior Publication Data
US 2023/0078875 A1    Mar. 16, 2023

(30) Foreign Application Priority Data
Mar. 9, 2020   (KR) .................. 10-2020-0029148

(51) Int. Cl.
*H01S 3/00*     (2006.01)
*B23K 26/0622*  (2014.01)
(Continued)

(52) U.S. Cl.
CPC ........ *H01S 3/0085* (2013.01); *B23K 26/0622* (2015.10); *G02F 1/365* (2013.01);
(Continued)

(58) Field of Classification Search
CPC ...... G02F 1/365; H01S 3/0057; H01S 3/0085; H01S 3/0092; H01S 3/06754; H01S 2301/02; B23K 26/0622
See application file for complete search history.

(56) References Cited

U.S. PATENT DOCUMENTS

| 9,287,677 B2 * | 3/2016 | Clowes ................. H01S 3/2375 |
| 10,256,592 B1 * | 4/2019 | Perryman ............. H01S 3/2316 |

(Continued)

FOREIGN PATENT DOCUMENTS

| KR | 10-2013-0142056 | 12/2013 |
| KR | 10-2015-0136487 | 12/2015 |

(Continued)

OTHER PUBLICATIONS

Can Kerse et al, "Ablation-cooled material removal with ultrafast bursts of pulses" Nature vol. 537, pp. 84-88, Jul. 13, 2016.
(Continued)

*Primary Examiner* — Daniel Petkovsek
(74) *Attorney, Agent, or Firm* — LEX IP MEISTER, PLLC

(57) ABSTRACT

A femtosecond laser source according to an embodiment of the present invention includes: a pulse generator that converts a continuous wave laser into an optical pulse train; a burst generator that separates the optical pulse train into a plurality of burst pulses; a pulse amplification and spectral broadening unit that expands the spectrum by amplifying a plurality of burst pulses; and a pulse compressor that com-
(Continued)

presses a plurality of amplified burst pulses to generate a femtosecond laser with a pulse width of 1 picosecond ($10^{-12}$ s) or less.

12 Claims, 2 Drawing Sheets

(51) Int. Cl.
  *G02F 1/365* (2006.01)
  *H01S 3/067* (2006.01)

(52) U.S. Cl.
  CPC .......... *H01S 3/0057* (2013.01); *H01S 3/0092* (2013.01); *H01S 3/06754* (2013.01); *H01S 2301/02* (2013.01)

(56) References Cited

U.S. PATENT DOCUMENTS

| | | | |
|---|---|---|---|
| 11,353,773 B2* | 6/2022 | Fendel | G02F 1/39 |
| 2014/0293404 A1* | 10/2014 | Pierrot | H01S 3/0057 |
| | | | 359/345 |
| 2020/0343682 A1* | 10/2020 | Honninger | H01S 3/0057 |
| 2022/0149579 A1* | 5/2022 | Yusim | H01L 21/324 |

FOREIGN PATENT DOCUMENTS

| | | |
|---|---|---|
| KR | 10-2016-0093801 | 8/2016 |
| KR | 10-2018-0006675 | 1/2018 |
| WO | 2019-138192 | 7/2019 |

OTHER PUBLICATIONS

Cheng-Hsiang Lin et al, "Investigations of femtosecond-nanosecond dual-beam laser ablation of dielectrics" Optics Letters, vol. 35, No. 14, Jul. 15, 2010.

J. S. Yahng et al, "Nonlinear enhancement of femtosecond laser ablation efficiency by hybridization with nanosecond laser" Optics Express vol. 14, No. 20, Oct. 2006.

\* cited by examiner

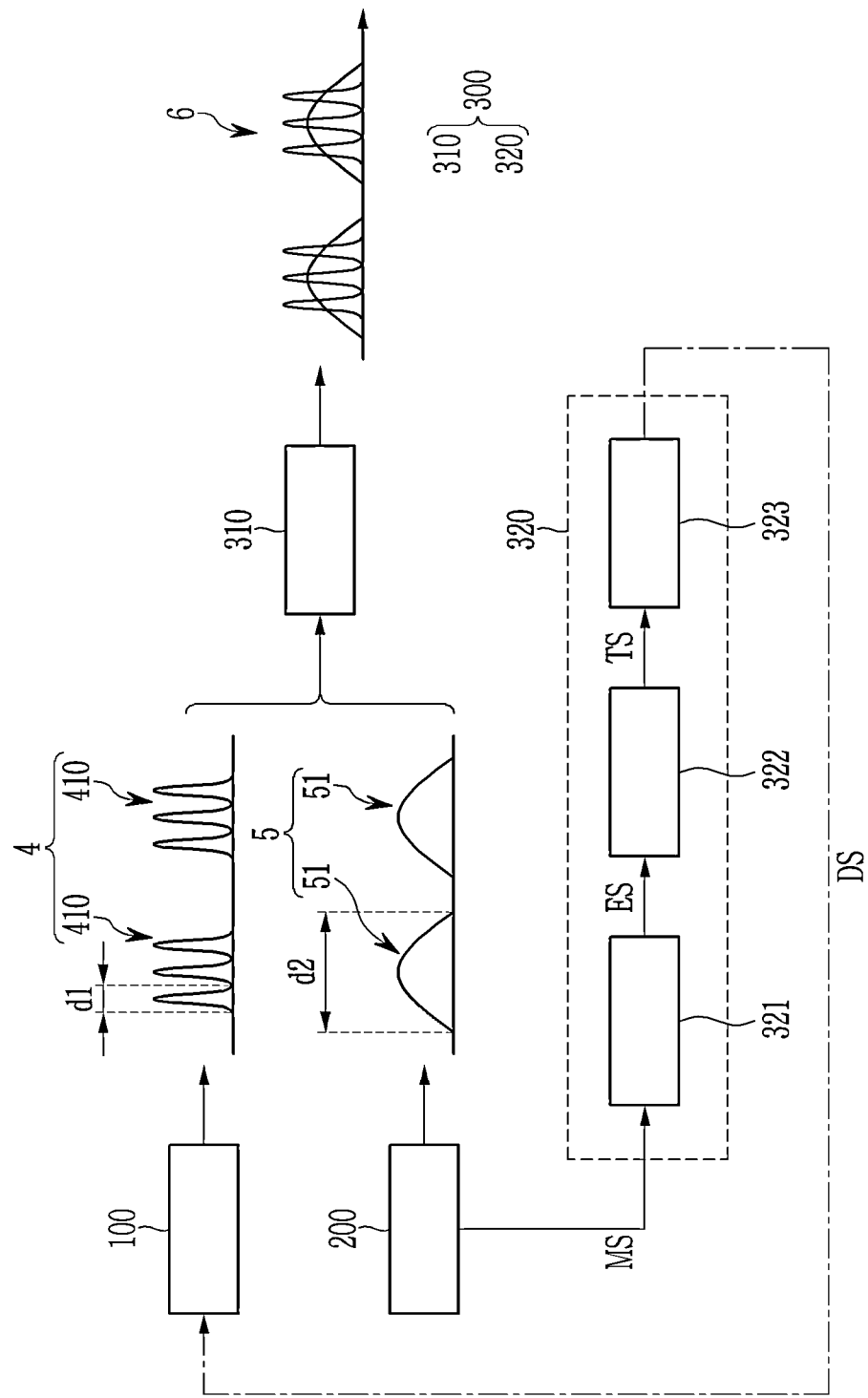

FIBER-BASED HIGH REPETITION RATE FEMTOSECOND LASER SOURCE AND LASER PROCESSING SYSTEM INCLUDING THE SAME

TECHNICAL FIELD

The present invention relates to a femtosecond laser source and a laser processing system including the same. More particularly, the present invention relates to a fiber-based femtosecond laser source with a fiber-based high repetition rate and a laser processing system including the same.

BACKGROUND ART

Laser processing has higher precision than mechanical processing and is capable of ultra-fine processing, so it is widely used in production of displays, semiconductors, PCB boards, and precision parts. As for the laser processing, a non-thermal processing is possible, so a femtosecond laser with excellent processing quality is gradually being introduced, but a nanosecond laser, which is still economical due to a high introduction cost of a femtosecond laser, is mainly used.

As such, the femtosecond laser is not widely applied in industry due to the high cost and low processing speed despite its high processing quality. Although it is a process that requires precision processing, a femtosecond laser cannot be introduced due to cost problems, and a post-process is added after the main processing. In addition, the processing speed of the femtosecond laser is slow compared to a nanosecond laser because the amount of processing per unit time is small.

In order to improve the processing speed while maintaining the processing quality of the femtosecond laser, research is being conducted to process materials by combining the femtosecond laser and the nanosecond laser in time and space, but the cost problem has been not solved because a high power femtosecond laser is still needed.

On the other hand, by using an ablation cooling effect that occurs during high repetition rate femtosecond laser processing, high-quality and high-speed processing is possible with relatively low pulse energy, but a high-power femtosecond laser is still required, which causes cost problems.

In addition, since the fiber-based high repetition rate femtosecond laser is very difficult to be implemented directly, a method of multiplying the repetition rate with a fiber interleaver after making a low repetition rate laser may be used, however, the asymmetric optical fiber of the interleaver requires a very long and precise length adjustment, so it is vulnerable to noise and temperature change, and an engineering cost occurs.

DISCLOSURE

Technical Problem

The present invention in order to solve the problem of the background art described above is to provide a femtosecond laser source capable of high-quality and high-speed laser processing at a low cost and a laser processing system including the same.

Technical Solution

A femtosecond laser source according to an embodiment of the present invention includes: a pulse generator that converts a continuous wave laser into an optical pulse train; a burst generator that separates the optical pulse train into a plurality of burst pulses; a pulse amplification and spectral broadening unit that expands the spectrum by amplifying a plurality of burst pulses; and a pulse compressor that compresses a plurality of amplified burst pulses to generate a femtosecond laser with a pulse width of 1 picosecond ($10^{-12}$ s) or less.

The pulse generator may include: a laser diode that generates a continuous wave laser; a modulator that modulates the continuous wave laser to generate an optical pulse train having a repetition rate of 0.5 GHz or more; and a phase shifter that controls the chirping state of the optical pulse train.

The modulator may include an intensity modulator for modulating the intensity of the continuous wave laser and a phase modulator for modulating the phase of the continuous wave laser.

The burst generator may include an optical modulator that divides the optical pulse train into a plurality of burst pulses, and the optical modulator may include an acousto-optic modulator or an electro-optic modulator.

An intra-burst repetition rate of the burst pulse may be greater than an inter-burst repetition rate of the burst pulse.

The pulse amplification and spectral broadening unit may include: an optical fiber amplifier to amplify a plurality of burst pulses; and a single-mode optical fiber that expands the spectrum of a plurality of burst pulses.

A band pass filter for removing the amplified spontaneous emission signal of a plurality of burst pulses passing through the single mode optical fiber may be further included.

The pulse compressor may include a de-chirping unit that compresses a plurality of amplified burst pulses, and the de-chirping unit may include a pair of diffraction grating or chirped fiber Bragg grating.

Also, a laser processing system according to an embodiment of the present invention includes: a femtosecond laser source that generates a femtosecond laser consisting of a femtosecond burst pulse having an intra-burst repetition rate of 0.5 GHz or more and a pulse width of 1 picosecond ($10^{-12}$ s) or less; a nanosecond laser source that generates a nanosecond laser; and a combiner that combines the femtosecond laser and the nanosecond laser, wherein pulse energy of the femtosecond laser is greater than an ablation threshold value of the object to be processed, and the pulse energy of the nanosecond laser is lower than an ablation threshold value of the object to be processed.

The femtosecond laser source may include: a pulse generator that converts a continuous wave laser into an optical pulse train; a burst generator that separates the optical pulse train into a plurality of burst pulses; a pulse amplification and spectral broadening unit that expands the spectrum by amplifying a plurality of burst pulses; and a pulse compressor that compresses a plurality of amplified burst pulses to generate a femtosecond laser with a pulse width of 1 picosecond ($10^{-12}$ s) or less.

The burst generator may include an optical modulator that divides the optical pulse train into a plurality of burst pulses, and an intra-burst repetition rate of the burst pulse may be greater than an inter-burst repetition rate of the burst pulse.

The combiner may include a spatial combiner that combines the femtosecond laser and the nanosecond laser in space, and a temporal combiner that combines the femtosecond burst pulse of the femtosecond laser and the nanosecond pulse of the nanosecond laser in time.

The temporal combiner may include a delay generator that coincides with the center of the femtosecond burst pulse with the center of the nanosecond pulse.

A driving signal for driving the optical modulator of the burst generator of the femtosecond laser source by using the delay signal generated by the delay generator is modulated so that the inter-burst repetition rate of a plurality of femtosecond burst pulses and the repetition rate a plurality of nanosecond pulses may be matched.

Advantageous Effects

The femtosecond laser source according to an embodiment of the present invention and the laser processing system including the same manufactures the low output femtosecond laser having the high repetition rate of 0.5 GHz or more, and since the ablation threshold value of the object to be processed may be reduced, the processing may be performed with low pulse energy, so the amplification cost may be reduced.

In addition, by replacing the expensive pulse amplification system with an inexpensive nanosecond laser, the cost of the entire laser processing system may be reduced.

In addition, by combining a high power nanosecond laser below the ablation threshold value with a low output femtosecond laser above the ablation threshold value having a high repetition rate, the mixed laser may be processed with the processing speed of the nanosecond laser while maintaining the processing quality of the femtosecond laser.

In addition, the femtosecond laser source of the present application is stable because the femtosecond laser having the high repetition rate of 0.5 GHz or more and the pulse width of 1 picosecond ($10^{-12}$ s) or less may be generated based on the optical fiber without an optical fiber interleaver.

DESCRIPTION OF THE DRAWINGS

FIG. 2 is a schematic view of a laser processing system including a femtosecond laser source according to an embodiment of the present invention.

MODE FOR INVENTION

Figure 1:
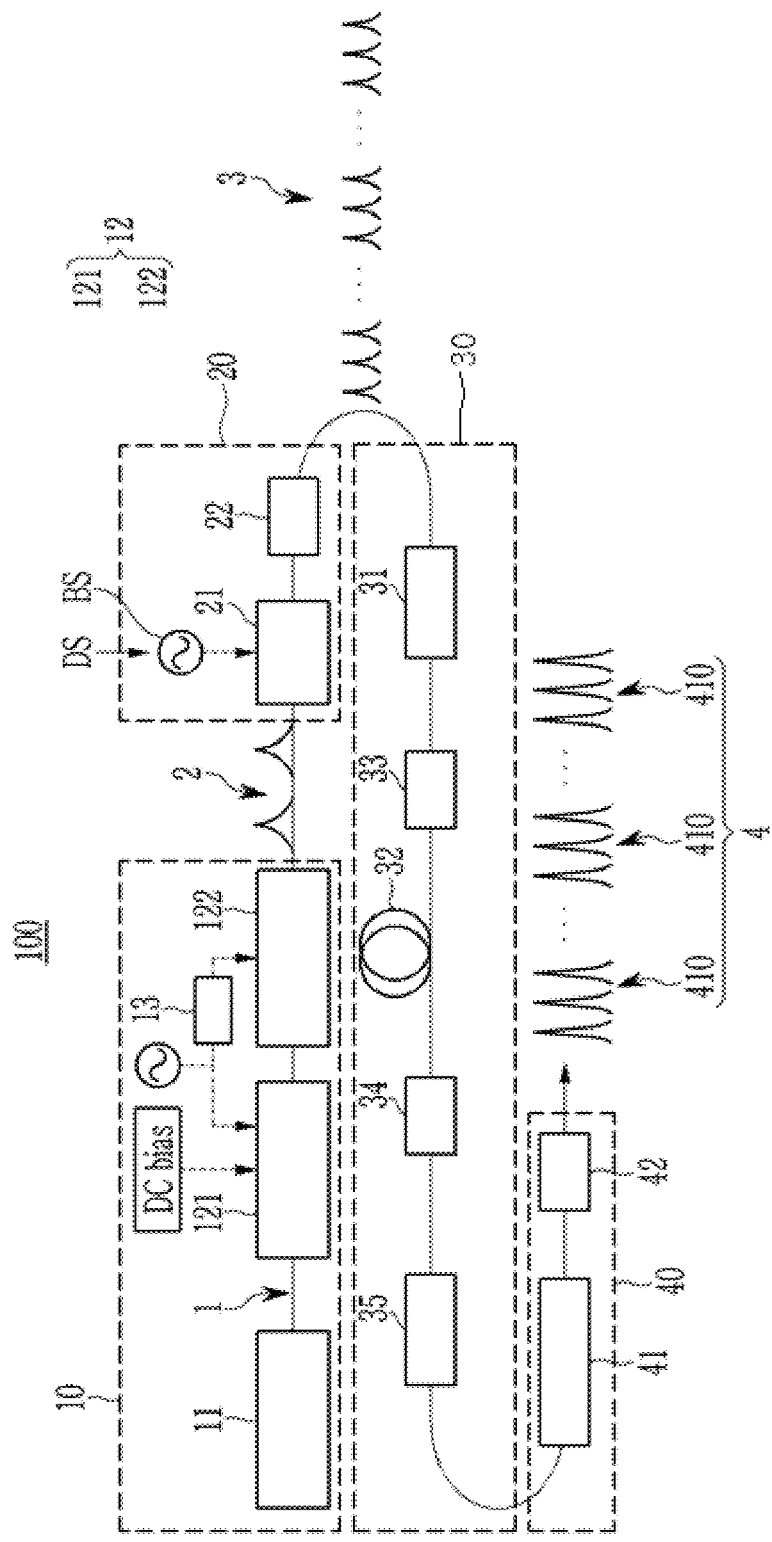
FIG. 1 is a schematic view of a femtosecond laser source according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Descriptions of parts not related to the present invention are omitted, and like reference numerals designate like elements throughout the specification.

Hereinafter, a femtosecond laser source and a laser processing system including the same according to an embodiment of the present invention are described in detail with reference to FIG. 1 and FIG. 2.

FIG. 1 is a schematic view of a femtosecond laser source according to an embodiment of the present invention.

As shown in FIG. 1, a femtosecond laser source 100 according to an embodiment of the present invention includes a pulse generator 10, a burst generator 20, a pulse amplification and spectral broadening unit 30, and a pulse compressor 40.

As shown in FIG. 1, the femtosecond laser source 100 according to an embodiment of the present invention may be an optical fiber-based laser source, and each component (a pulse generator, a burst generator, a pulse amplification, a spectral broadening unit, and a pulse compressor) constituting the generator may be connected mutually with an optical fiber, and constituent elements constituting each component may be connected by optical fiber.

The pulse generator 10 may convert a continuous wave laser 1 into an optical pulse train 2.

The pulse generator 10 may include a laser diode 11, a modulator 12, and a phase shifter 13.

The laser diode 11 may generate a continuous wave laser 1 by using a forward direction semiconductor junction member.

The modulator 12 may modulate the continuous wave laser 1 to be converted into an optical pulse train 2 having a repetition rate of 0.5 GHz or more. The modulator 12 may include an intensity modulator 121 that modulates intensity of the continuous wave laser 1, and a phase modulator 122 that modulates a phase of the continuous wave laser 1. The intensity modulator 121 converts the continuous wave type of laser into a pulse type, and the phase modulator 122 plays a role of chirping the optical pulse train so that the optical pulse may be compressed to 1 ps or less later. By driving the intensity modulator 121 and the phase modulator 122 with a frequency of 0.5 GHz or more, an optical pulse train 2 having a repetition rate of 0.5 GHz or more may be generated. This light modulation-based pulse generation method has superior stability and reproducibility compared to a conventional mode lock method, thereby being suitable for mass production and harsh industrial environments.

The phase shifter 13 may control the chirping state of the optical pulse train 2. A DC bias voltage may be applied to the intensity modulator 121 to get a clean pulse shape and the phase shifter 13 may be adjusted.

The burst generator 20 may divide the optical pulse train 2 into a plurality of burst pulses 3. The intra-bus repetition rate of the burst pulse 3 may be greater than the inter-bus repetition rate of the burst pulse 3. The intra-burst repetition rate of the burst pulse 3 is a high repetition rate of 0.5 GHz or more, and the inter-burst repetition rate of the burst pulse 3 may be a repetition rate of 10 MHz or less.

The burst generator 20 may include an optical modulator 21 that separates the optical pulse train 2 into a plurality of burst pulses 3, and a first isolator 22 that blocks signal propagation in a reverse direction.

In order to amplify the pulse energy of the optical pulse train 2 having the high repetition rate of 0.5 GHz or more, a pumping source with a very large output is required. In this case, since the optical pulse train 2 is periodically cut by using the optical modulator 21 to make the burst pulse 3, a pumping source having a very large output is not required to amplify the pulse energy, thereby reducing manufacturing cost.

The optical modulator 21 may include an acousto-optic modulator (AOM) or an electro-optic modulator (EOM).

At this time, a time and a duty cycle for breaking the optical pulse train 2 may be controlled by a driving signal BS for driving the optical modulator 21.

The pulse amplification and spectral broadening unit 30 may expand a spectrum by the amplification of a plurality of burst pulses 3.

The burst pulse 3 having the intra-burst repetition rate, which is a high repetition rate of 0.5 GHz or higher, has a narrow optical spectrum, so tens of picoseconds is the limit even if the pulse width is compressed as much as possible. Therefore, the pulse amplification and spectral broadening unit 30 of the present invention may expand the optical spectrum to compress the pulse width as much as possible.

The pulse amplification and spectral broadening unit 30 includes an optical fiber amplifier 31 for amplifying a plurality of burst pulses 3, a single mode optical fiber 32 for expanding the optical spectrum of a plurality of burst pulses 3, and a second isolator 33 positioned between the optical fiber amplifier 31 and the single mode optical fiber 32.

The optical fiber amplifier 31 may include a ytterbium-doped optical fiber amplifier (YDFA). However, it is not limited thereto, and various types of optical fiber amplifiers may be used.

The single mode optical fiber 32 may cause a self-phase modulation by nonlinearity of the single mode optical fiber 32 to expand the optical spectrum of a plurality of burst pulses 3. Although not shown in the drawing, according to an embodiment of the present invention, it is possible to add a device for compressing the pulse width in advance before going through the single-mode optical fiber 32 in order to enhance the self-phase modulation phenomenon. In this case, the device for compressing the pulse width may include a pair of diffraction gratings or chirped fiber brag gratings (CFBG).

By installing the first isolator 22 and the second isolator 33 before and after the optical fiber amplifier 31, respectively, it is possible to block a residual pump and unwanted signals from returning.

In addition, the pulse amplification and spectral broadening unit 30 may further include a band pass filter (BPF) 34 that passes only a frequency band of a limited range, and an auxiliary optical fiber amplifier 35. In this case, the femtosecond laser source 100 according to an embodiment of the present invention may generate larger pulse energy having a better signal-to-noise ratio (S/N).

The band pass filter 34 may remove an amplified spontaneous emission signal of a plurality of burst pulses 3 having the optical spectrum extended by passing through the single mode optical fiber 32.

In addition, a plurality of burst pulses 3 may be amplified once again using the auxiliary optical fiber amplifier 35. The core size of the auxiliary optical fiber amplifier 35 may be larger than a core size of the optical fiber amplifier 31.

The pulse compressor 40 may compress a plurality of amplified burst pulses 3 to generate a femtosecond laser 4 including a plurality of femtosecond burst pulses 410 having a pulse width d1 of 1 picosecond ($10^{-12}$ s) or less.

The pulse compressor 40 may include a de-chirping unit 41 for compressing a plurality of amplified burst pulses 3, and a third isolator 42.

The de-chirping unit 41 may include a pair of diffraction gratings or chirped fiber brag gratings (CFBG).

The third isolator 42 may block the return of the femtosecond laser 4 that has passed through the pulse compressor 40 again.

Therefore, the femtosecond laser source 100 according to an embodiment of the present invention may generate a femtosecond laser 4 of a low output having the intra-burst repetition rate of 0.5 GHz or more and the pulse width d1 of 1 picosecond ($10^{-12}$ s) or less.

The laser processing system including the femtosecond laser source 100 according to this an embodiment of the present invention is described in detail with reference to the drawing below.

FIG. 2 is a schematic view of a laser processing system including a femtosecond laser source according to an embodiment of the present invention.

As shown in FIG. 2, the laser processing system according to an embodiment of the present invention may include a femtosecond laser source 100, a nanosecond laser source 200, and a combiner 300.

The femtosecond laser source 100 may generate the low output femtosecond laser 4 consisting of a plurality of femtosecond burst pulses 410 having the intra-burst repetition rate of 0.5 GHz or more and the pulse width d1 of 1 picosecond ($10^{-12}$ s) or less. In this case, the inter-burst repetition rate between a plurality of femtosecond burst pulses 410 may be a repetition rate of 10 MHz or less.

At this time, the pulse energy of the femtosecond laser 4 may be greater than an ablation threshold value of an object to be processed. At this time, since the femtosecond laser 4 has the intra-burst high repetition rate, so when processing the object to be processed by using the femtosecond laser 4, because of the ablation cooling effect, the ablation threshold value of the object to be processed is reduced by about 10 to 100 times. Accordingly, the pulse energy of the femtosecond laser 4 may be greater than the ablation threshold value of the object to be processed. Therefore, since processing is possible even with low pulse energy, amplification cost can be reduced.

The nanosecond laser source 200 may generate a high power nanosecond laser 5 consisting of a nanosecond pulse 51 with a pulse width d2 of nanoseconds ($10^{-9}$ s).

The pulse energy of the nanosecond laser 5 may be lower than the ablation threshold value of the object to be processed.

In order to obtain the desired processing speed, the output of the nanosecond laser 5 must be adjusted. At this time, the output of the nanosecond laser 5 may be calculated as a product of the pulse energy and a repetition rate. For example, in order to generate the nanosecond laser 5 with the output of 100 W, when the pulse energy is 10 uJ, it must be the nanosecond laser with the repetition rate of 10 MHz The object to be processed may be a non-metal material such as a silicon wafer (Si wafer), a glass substrate ($SiO_2$), or an organic light emitting diode (OLED).

The combiner 300 may combine the femtosecond laser 4 and the nanosecond laser 5 to form a mixed laser 6 with improved processing speed.

The combiner 300 may include a spatial combiner 310 for combining the femtosecond laser 4 and the nanosecond laser 5 in space, and a temporal combiner 320 for combining the femtosecond burst pulse 410 of the femtosecond laser 4 and the nanosecond pulse 51 of the nanosecond laser 5 in time.

The spatial combiner 310 may include a beam splitter, and the femtosecond laser 4 and the nanosecond laser 5 may be combined in space by using the beam splitter.

The temporal combiner 320 includes an optical diode 321 that converts a monitoring signal MS of the nanosecond laser 5 into an electrical signal ES, an RF amplifier 322 that generates a trigger signal TS by amplifying the electrical signal ES generated from the optical diode 321, and a delay generator 323 for generating a delay signal DS that coincides the center of the femtosecond burst pulse 410 and the center of the nanosecond pulse 51 by using the trigger signal TS.

As shown in FIG. 1, the delay generator 323 modulates the driving signal BS for driving the optical modulator 21 of the burst generator 20 of the femtosecond laser source 100 by using the delay signal DS, so that the inter-burst repetition rate of a plurality of femtosecond burst pulses 410 and the burst repetition rate of a plurality of nanosecond pulse 51 may be matched.

In this way, by matching the inter-burst repetition rate of the low output femtosecond laser 4 with the repetition rate of the high power nanosecond laser 5, the processing speed of the mixed laser 6 may be improved.

When irradiating the mixed laser 6 to the object to be processed made of the non-metal material with a large band gap, some electrons are placed from a valence band to a conduction band with a strong peak intensity of the femtosecond laser 4 having the high repetition rate to be ionized (photo-ionization). In addition, the photo-ionized electrons are accelerated while absorbing the vast energy of the nanosecond laser 5 with high power with a counter-braking radiation to ionize the surrounding electrons (impact ionization). As the ionization of these electrons occurs in a chain (avalanche ionization), a coulomb explosion occurs, and the object to be processed is processed.

Since the pulse energy of the nanosecond laser 5 with high power is below the ablation threshold value of the object to be processed, the mixed laser 6 may only improve processing speed without deteriorating the processing quality of the femtosecond laser 4. In the case of femtosecond laser 4, since the intra-burst repetition rate is high, an ablation cooling effect, in which only a local area of the processed part is removed by occurrence of a heat accumulation before the processing heat is diffused to the surroundings occurs, and then the ablation threshold value of the object to be processed is reduced by 10 to 100 times. Therefore, the processing is possible even with low pulse energy, so the amplification cost may be reduced.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

(Description of Symbols)

| | |
|---|---|
| 100: femtosecond laser source | 200: nanosecond laser source |
| 300: combiner | 310: spatial combiner |
| 320: temporal combiner | |

The invention claimed is:

1. A femtosecond laser source comprising:
   a pulse generator configured to convert a continuous wave laser into an optical pulse train;
   a burst generator configured to separate the optical pulse train into a plurality of burst pulses;
   a pulse amplification and spectral broadening unit configured to expand a spectrum and amplify the plurality of burst pulses; and
   a pulse compressor configured to compress the plurality of amplified and spectrum expanded burst pulses to generate a femtosecond laser with a pulse width of 1 picosecond ($10^{-12}$s) or less,
   wherein the pulse generator comprises:
   a laser diode that generate the continuous wave laser; and
   a modulator that modulates the continuous wave laser to generate the optical pulse train having a repetition rate of 0.5 GHz or more,
   wherein the modulator comprises:
   an intensity modulator modulating the intensity of the continuous wave laser; and
   a phase modulator modulating the phase of the continuous wave laser, and
   wherein the intensity modulator and the phase modulator are driven with a frequency of 0.5 GHz or more to generate the optical pulse train having the repetition rate of 0.5 GHz or more.

2. The femtosecond laser source of claim 1, wherein the pulse generator further comprises:
   a phase shifter that controls a chirping state of the optical pulse train.

3. The femtosecond laser source of claim 1, wherein
   the burst generator includes an optical modulator that performs the separation of the optical pulse train into the plurality of burst pulses, and
   the optical modulator includes an acousto-optic modulator or an electro-optic modulator.

4. The femtosecond laser source of claim 3, wherein
   an intra-burst repetition rate of the plurality of burst pulses is greater than an inter-burst repetition rate of the plurality of burst pulses.

5. The femtosecond laser source of claim 1, wherein
   the pulse amplification and spectral broadening unit includes:
   an optical fiber amplifier to amplify a plurality of burst pulses; and
   a single-mode optical fiber that expands the spectrum of a plurality of burst pulses.

6. The femtosecond laser source of claim 5, further comprising
   a band pass filter for removing the amplified spontaneous emission signal of a plurality of burst pulses passing through the single mode optical fiber.

7. The femtosecond laser source of claim 6, wherein
   the pulse compressor includes a de-chirping unit that compresses a plurality of amplified burst pulses, and
   the de-chirping unit includes a pair of diffraction gratings or chirped fiber brag gratings.

8. A laser processing system comprising:
   a femtosecond laser source configured to generate a femtosecond laser consisting of a femtosecond burst pulse having an intra-burst repetition rate of 0.5 GHZ or more and a pulse width of 1 picosecond ($10^{-12}$s) or less;
   a nanosecond laser source configured to generate a nanosecond laser; and
   a combiner configured to combine the femtosecond laser and the nanosecond laser,
   wherein pulse energy of the femtosecond laser is greater than an ablation threshold value of the object to be processed, and
   pulse energy of the nanosecond laser is lower than the ablation threshold value of the object to be processed,
   wherein the femtosecond laser source comprises:
   a pulse generator configured to convert a continuous wave laser into an optical pulse train;
   a burst generator configured to separate the optical pulse train into a plurality of burst pulses;
   a pulse amplification and spectral broadening unit configured to expand a spectrum and amplify the plurality of burst pulses; and
   a pulse compressor configured to compress the plurality of amplified and spectrum expanded burst pulses to generate the femtosecond laser with the pulse width of 1 picosecond ($10^{-12}$s) or less,
   wherein the pulse generator comprises:
   a laser diode that generate the continuous wave laser; and
   a modulator that modulates the continuous wave laser to generate the optical pulse train having a repetition rate of 0.5 GHz or more, wherein the modulator comprises:

an intensity modulator modulating the intensity of the continuous wave laser; and a phase modulator modulating the phase of the continuous wave laser, and wherein the intensity modulator and the phase modulator are driven with a frequency of 0.5 GHz or more to generate the optical pulse train having the repetition rate of 0.5 GHz or more.

9. The laser processing system of claim 8, wherein the femtosecond laser source includes:

a pulse generator that converts a continuous wave laser into an optical pulse train;

a burst generator that separates the optical pulse train into a plurality of burst pulses;

a pulse amplification and spectral broadening unit that expands the spectrum by amplifying a plurality of burst pulses; and a pulse compressor that compresses a plurality of amplified burst pulses to generate a femtosecond laser with a pulse width of 1 picosecond ($10^{-12}$s) or less.

10. The laser processing system of claim 9, wherein the burst generator includes an optical modulator that performs the separation of the optical pulse train into the plurality of burst pulses, and the intra-burst repetition rate of the plurality of burst pulses is greater than the inter-burst repetition rate of the plurality of burst pulses.

11. The laser processing system of claim 10, wherein the combiner includes:

a spatial combiner that combines the femtosecond laser and the nanosecond laser in space; and a temporal combiner that combines the femtosecond burst pulse of the femtosecond laser and the nanosecond pulse of the nanosecond laser in time.

12. The laser processing system of claim 11, wherein the temporal combiner includes a delay generator that coincides the center of the femtosecond burst pulse with the center of the nanosecond pulse, and a driving signal for driving the optical modulator of the burst generator of the femtosecond laser source by using the delay signal generated by the delay generator that is modulated so that the inter-burst repetition rate of a plurality of femtosecond burst pulses and the repetition rate a plurality of nanosecond pulse are matched.

* * * * *